(12) United States Patent
Oshida

(10) Patent No.: US 10,382,419 B2
(45) Date of Patent: Aug. 13, 2019

(54) COMMUNICATION DEVICE, LSI, PROGRAM, AND COMMUNICATION SYSTEM

(71) Applicant: Renesas Electronics Corporation, Tokyo (JP)

(72) Inventor: Daisuke Oshida, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 185 days.

(21) Appl. No.: 14/933,195

(22) Filed: Nov. 5, 2015

(65) Prior Publication Data

US 2016/0219029 A1    Jul. 28, 2016

(30) Foreign Application Priority Data

Jan. 27, 2015  (JP) ................................. 2015-012876

(51) Int. Cl.
    *H04L 9/32*      (2006.01)
    *G06F 21/44*     (2013.01)
    (Continued)

(52) U.S. Cl.
    CPC ............ *H04L 63/08* (2013.01); *H04L 9/3247* (2013.01); *H04L 9/3263* (2013.01);
    (Continued)

(58) Field of Classification Search
    CPC ... H04L 9/32; H04L 63/08; H04L 9/14; G06F 21/44
    See application file for complete search history.

(56) References Cited

U.S. PATENT DOCUMENTS 7,210,037 B2   4/2007  Samar
7,873,859 B2   1/2011  Zhu et al.
(Continued)

FOREIGN PATENT DOCUMENTS

JP   2005-502217 A   1/2005
JP   2005-057479 A   3/2005
(Continued)

OTHER PUBLICATIONS

Japanese Office Action dated Jul. 31, 2018, with an English translation.

(Continued)

*Primary Examiner* — Izunna Okeke
(74) *Attorney, Agent, or Firm* — McGinn IP Law Group, PLLC

(57) ABSTRACT

An object of the present invention is to prevent an attack from or via a communication device on an information apparatus in a communication system including the information apparatus, the communication device coupled to the information apparatus in the aftermarket, a server that authenticates the communication device, and a communication unit between the communication device and the server. A communication device includes a first interface that performs first communications with a server, a second interface that performs second communications with an information apparatus, and an information processing unit that performs an information process including a communication protocol process accompanied by the first and second communications. The information processing unit of the communication device sends a signature of the communication device from the first interface to the server, receives via the first interface a driver sent after the server authenticates the communication device on the basis of the (Continued)

received signature, and sends the received driver from the second interface to the information apparatus.

20 Claims, 10 Drawing Sheets

(51) Int. Cl.
  *H04L 29/06* (2006.01)
  *H04W 4/04* (2009.01)
  *H04W 4/40* (2018.01)
  *H04L 29/08* (2006.01)
  *H04M 1/02* (2006.01)
  *H04W 12/10* (2009.01)
  *H04W 12/12* (2009.01)

(52) U.S. Cl.
  CPC ...... *H04L 63/0428* (2013.01); *H04L 63/0442* (2013.01); *H04L 63/0823* (2013.01); *H04L 67/1095* (2013.01); *H04L 67/12* (2013.01); *H04M 1/0202* (2013.01); *H04W 4/046* (2013.01); *H04W 4/40* (2018.02); *H04W 12/10* (2013.01); *H04L 2209/84* (2013.01); *H04W 12/12* (2013.01)

(56) References Cited

U.S. PATENT DOCUMENTS

| | | | |
|---|---|---|---|
| 7,873,959 B2 | 1/2011 | Zhu et al. | |
| 2003/0195951 A1* | 10/2003 | Wittel, Jr. | H04L 67/34 709/220 |
| 2010/0318798 A1 | 12/2010 | Binding et al. | |
| 2015/0005981 A1* | 1/2015 | Grimm | G07C 5/008 701/1 |

FOREIGN PATENT DOCUMENTS

| | | |
|---|---|---|
| JP | 2006-216047 A | 8/2006 |
| JP | 2007-036611 A | 2/2007 |
| JP | 2009-543414 A | 12/2009 |
| JP | 2011-018176 A | 1/2011 |
| WO | WO 2008/126183 A1 | 10/2008 |

OTHER PUBLICATIONS

Japanese Office Action dated Mar. 5, 2019 in corresponding Japanese Patent Application No. 2015-012876, with an English translation thereof.

\* cited by examiner

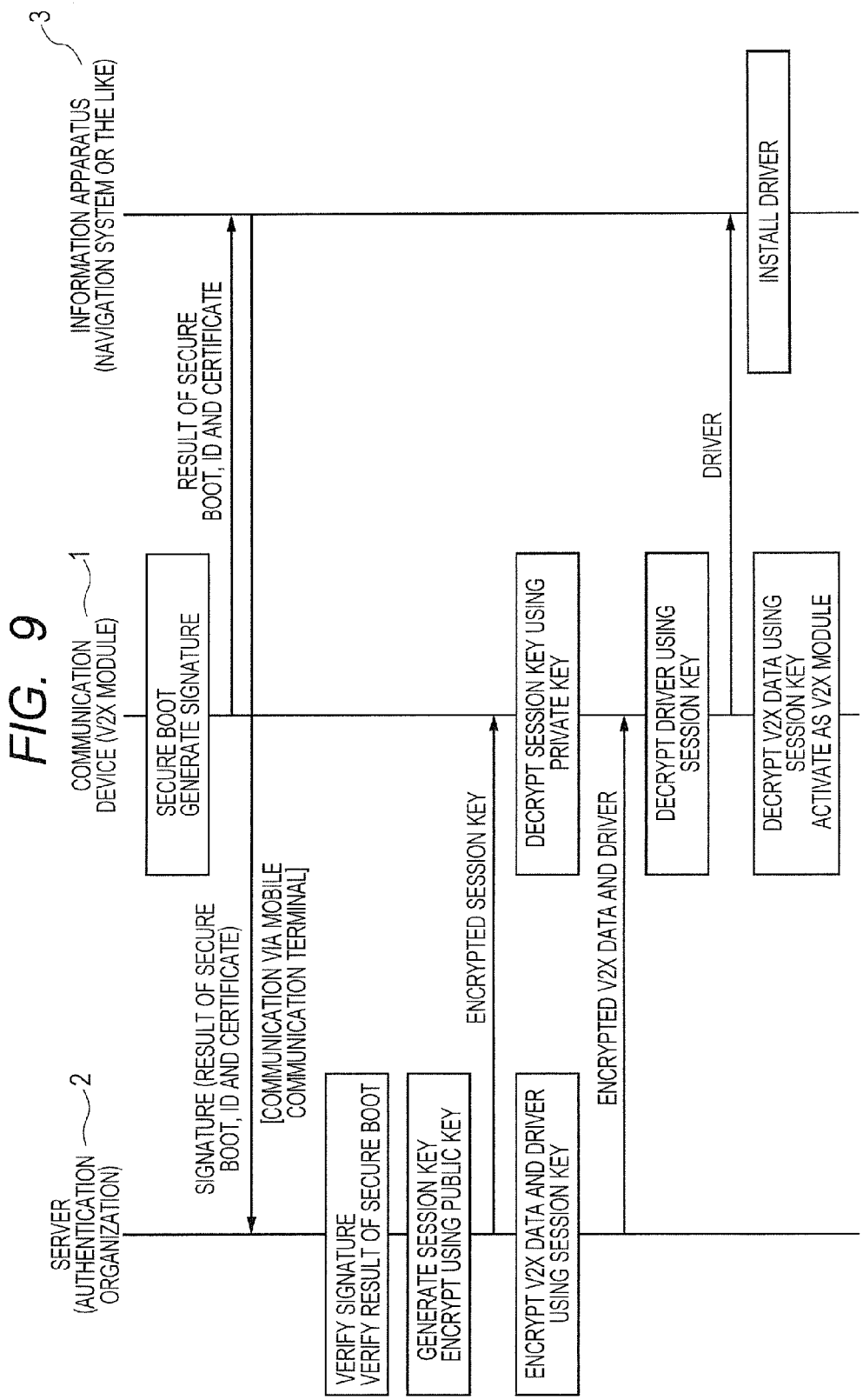

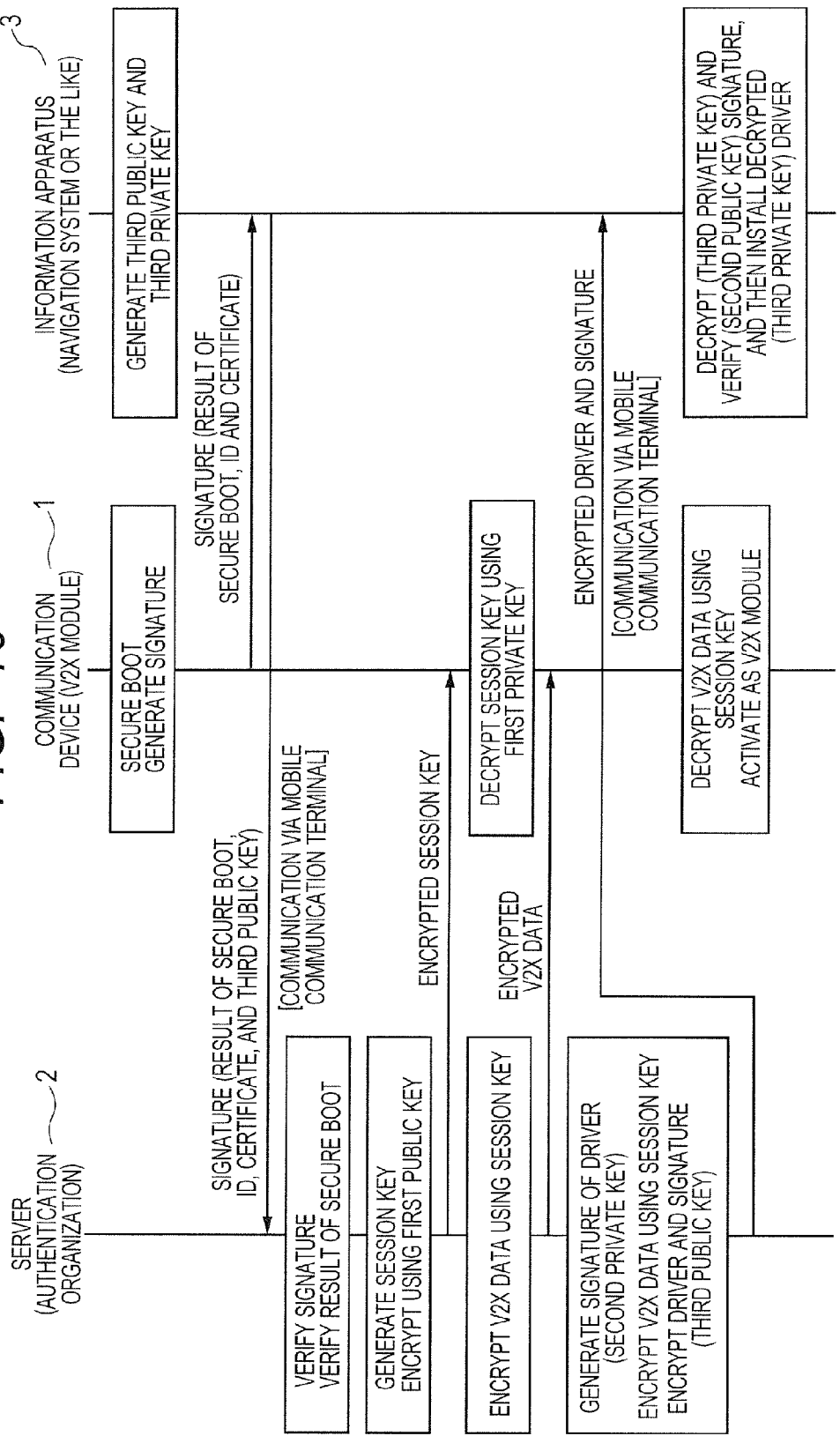

COMMUNICATION DEVICE, LSI, PROGRAM, AND COMMUNICATION SYSTEM

CROSS-REFERENCE TO RELATED APPLICATIONS

The disclosure of Japanese Patent Application No. 2015-012876 filed on Jan. 27, 2015 including the specification, drawings and abstract is incorporated herein by reference in its entirety.

BACKGROUND

The present invention relates to a communication device, an LSI (Large Scale Integrated circuit), a program, and a communication system, and can be particularly and preferably used in a communication device coupled to an information apparatus.

The practical application of technology so-called V2X communications (Vehicle to (2) others (X) communications) such as vehicle-to-vehicle communications and road-vehicle communications has been examined in the automobile field. The mechanism of the technology is as follows: an automobile broadcasts the location of the automobile through wireless communications, and another automobile having received the location detects the possibility of a collision to be notified to a driver through an information apparatus inside the automobile, such as a navigation system or a display audio system. Specifically, the technology aims at preventing a collision between automobiles, and the improvement of safety can be expected.

SUMMARY

As a result of an examination of the V2X communications, the inventors found the following new problems.

The technology is based on that both automobiles simultaneously approaching an intersection or the like have the same communication functions. Therefore, automobiles that have been already sold and out on the market can newly participate in the V2X communications by additionally obtaining and mounting (mounting in the aftermarket) a communication device (V2X module) used for the V2X communications later. Further, the V2X module does not necessarily incorporate a device (a display device or another warning device) that notifies a driver of a warning of a collision or the like by means of a display or an alert. Instead, the V2X module is coupled to an information apparatus already mounted in an on-vehicle network such as a navigation system or a display audio system, and is designed to notify a driver of warning information using a display function or a notification function of the information apparatus in many cases.

An examination of security in a state where the V2X module is coupled to the information apparatus or the like has been progressed from the past by a V2X communication standardization organization and the like. However, security in the case where the communication device (V2X module) is additionally mounted in the aftermarket as described above has not been examined.

As a result of the examination by the inventors, the inventors found that if the communication device (V2X module) is coupled to the information apparatus such as a navigation system or a display audio system in the aftermarket, there is a risk that the information apparatus, an on-vehicle network to which the information apparatus is coupled, and other devices coupled to the same on-vehicle network are attacked from the connection part between the V2X module and the information apparatus. Because if a malicious attacker prepares malware in the communication device (V2X module), the attacker can enter the on-vehicle network via the information apparatus such as a navigation system or a display audio system, or can send fraudulent packets to the on-vehicle network by taking over the information apparatus such as a navigation system or a display audio system.

Means to solve the above-described problems will be described below. However, the other problems and novel features will become apparent from the description of the specification and the accompanying drawings.

According to an embodiment, the following is disclosed.

Specifically, a communication system including an information apparatus, a communication device coupled to the information apparatus, a server, and a communication unit between the communication device and the server is configured as follows. The server holds a driver that is installed in the information apparatus to allow the information apparatus to cooperate with the communication device. The communication device transmits a signature of the communication device to the server when being coupled to the information apparatus. When it is determined that the communication device is an authorized communication device as a result of verification of the received signature, the server transmits the driver to the information apparatus, and the information apparatus installs the received driver.

Further, the communication device according to an embodiment is configured as follows.

Specifically, a communication device includes a first interface that performs first communications with a server, a second interface that performs second communications with an information apparatus, and an information processing unit that performs an information process including a communication protocol process accompanied by the first and second communications. The information processing unit of the communication device sends a signature of the communication device from the first interface to the server, receives via the first interface a driver sent after the server authenticates the communication device on the basis of the received signature, and sends the received driver from the second interface to the information apparatus.

The term "driver" in this case is software that is installed and executed in an information apparatus to allow the information apparatus to cooperate with a communication device, and the term "to cooperate" means to operate the information apparatus on the basis of control, commands, or instructions from the communication device.

The following is a brief description of effects obtained from the embodiment.

Specifically, it is possible to prevent an attack from or via a communication device on an information apparatus.

BRIEF DESCRIPTION OF THE DRAWINGS

FIG. 9 is a flow diagram for showing a communication protocol performed by a communication system and a communication device according to the fourth embodiment; and FIG. 10 is a flow diagram for showing a communication protocol performed by a communication system and a communication device according to the fifth embodiment.

DETAILED DESCRIPTION

Embodiments will be described in detail.

First Embodiment

Figure 1:
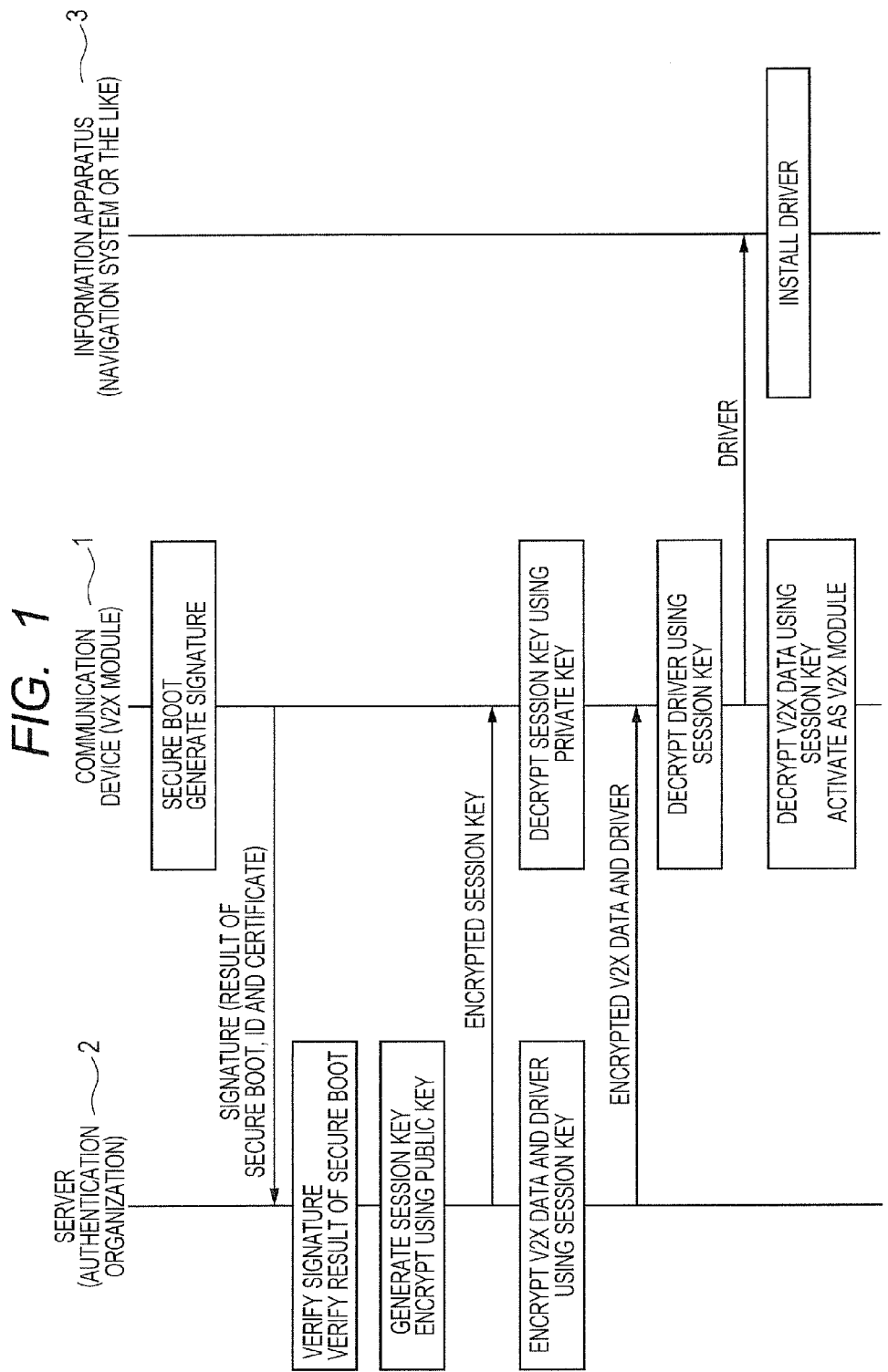
FIG. 1 is a flow diagram for showing a communication protocol performed by a communication system and a communication device according to a first embodiment.
Figure 2:
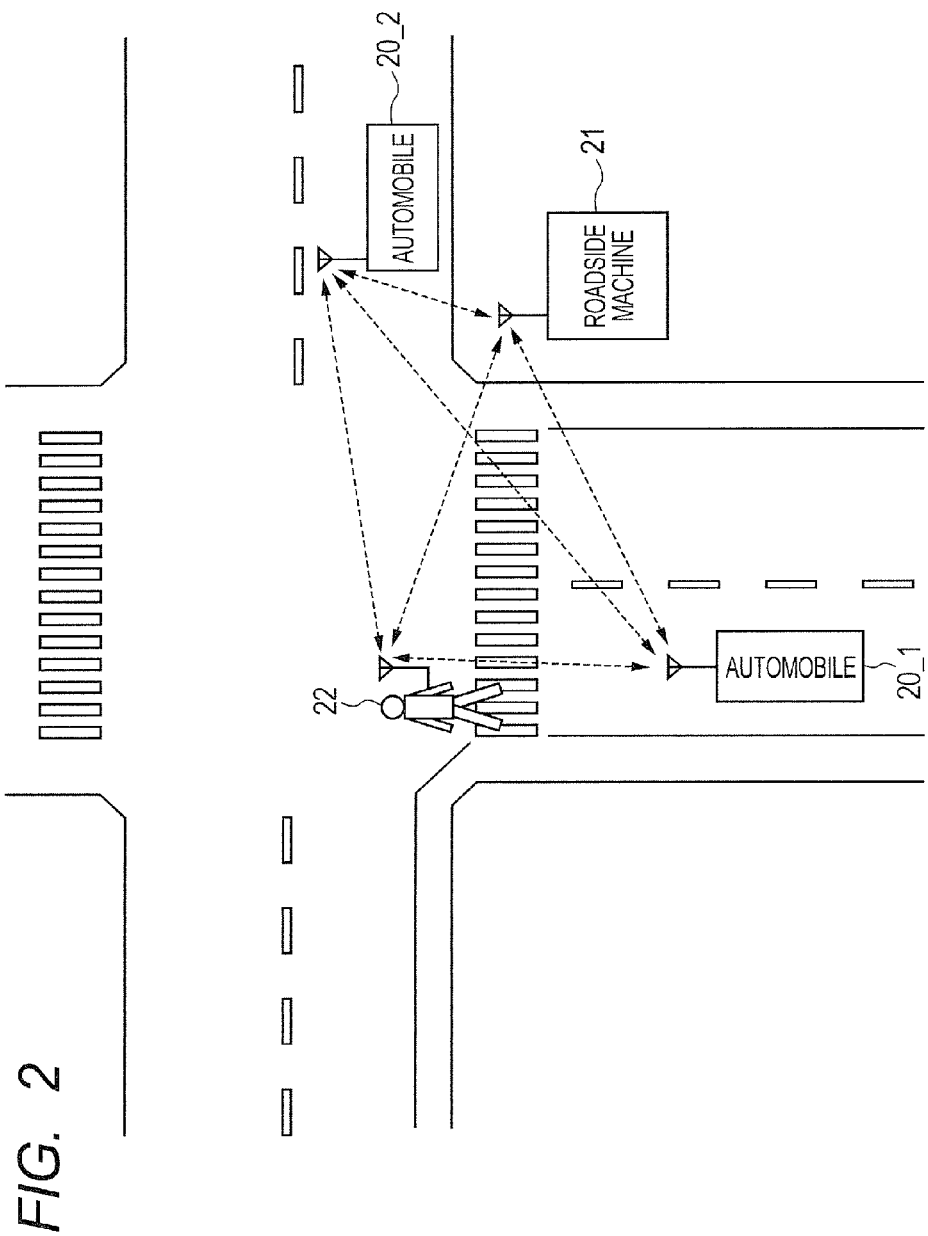
FIG. 2 is an explanatory diagram about V2X communications.
Figure 3:
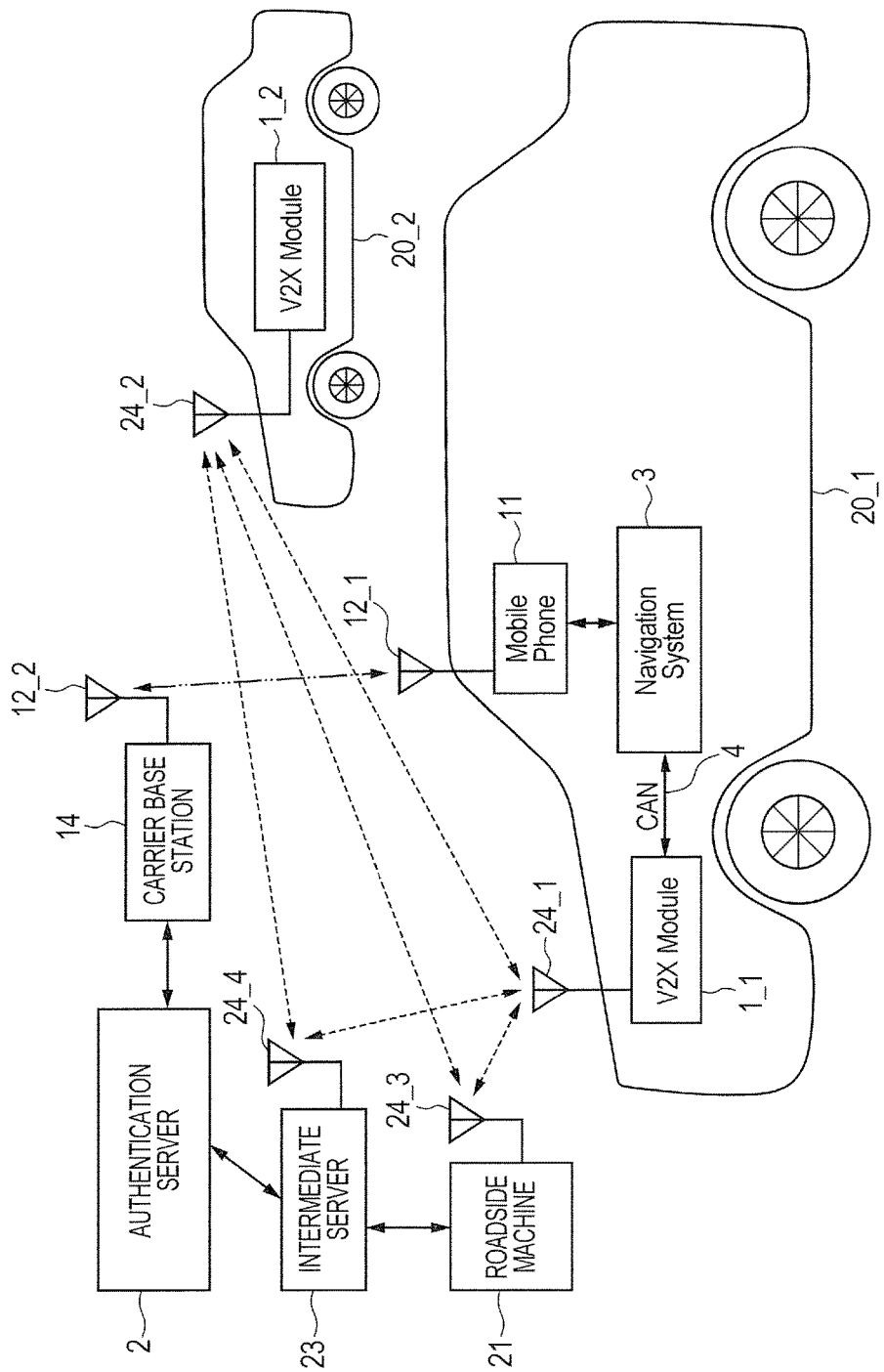
FIG. 3 is a more detailed explanatory diagram about V2X communications.

FIG. 1 is a flow diagram for showing a communication protocol performed by a communication system 100 and a communication device 1 according to a first embodiment. FIG. 2 is an explanatory diagram about V2X communications to which the first embodiment can be applied, and FIG. 3 is a more detailed explanatory diagram thereof. As shown in FIG. 2, the V2X communications are performed among a vehicle 20_1 such as an automobile, another vehicle 20_2, a pedestrian 22, and a roadside machine 21, and an accident such as a collision is prevented by exchanging, for example, mutual positions and speed information. Such as the communications between the pedestrian 22 and the roadside machine 21, communications performed among objects having various communication devices that are not limited to vehicles such as automobiles may participate in the V2X communications. In the V2X communications of this case, provided are various pieces of information used in communications among objects other than vehicles as well as positional information of the vehicles and the pedestrian, speed information, traffic signal and traffic regulation information, and traffic obstruction information such as road surface freezing, flooding, and obstacles. The vehicle (automobile) 20_1 includes a navigation system 3, and may further include a mobile communication terminal 11 coupled to the navigation system 3. This feature will be described later in detail. The automobile 20_1 is sold in a state where no V2X module is mounted, and a use mode such as adding a V2X module 1_1 later (in the aftermarket) is contemplated. The additionally-mounted V2X module 1_1 is not particularly restricted, but is coupled to, for example, the navigation system 3 via a CAN (Controller Area Network) 4. A wired or wireless connection may be established such as USB (Universal Serial Bus), Bluetooth (Registered Trademark), and Wi-Fi (Wireless Fidelity). Specifically, the connection is not particularly limited as long as communications can be secured. For example, as shown in FIG. 3, the V2X communications include an authentication server 2, an intermediate server 23, and the roadside machine 21, and are performed between the vehicle 20_1 and the other automobile 20_2 with the V2X module 1_2 already mounted via antennas 24_1 to 24_4. The authentication server 2 may be configured using a plurality of servers. FIG. 3 shows an example in which the authentication server 2 is coupled to a carrier base station 14, and this example will be described in the following embodiment.

Figure 4:
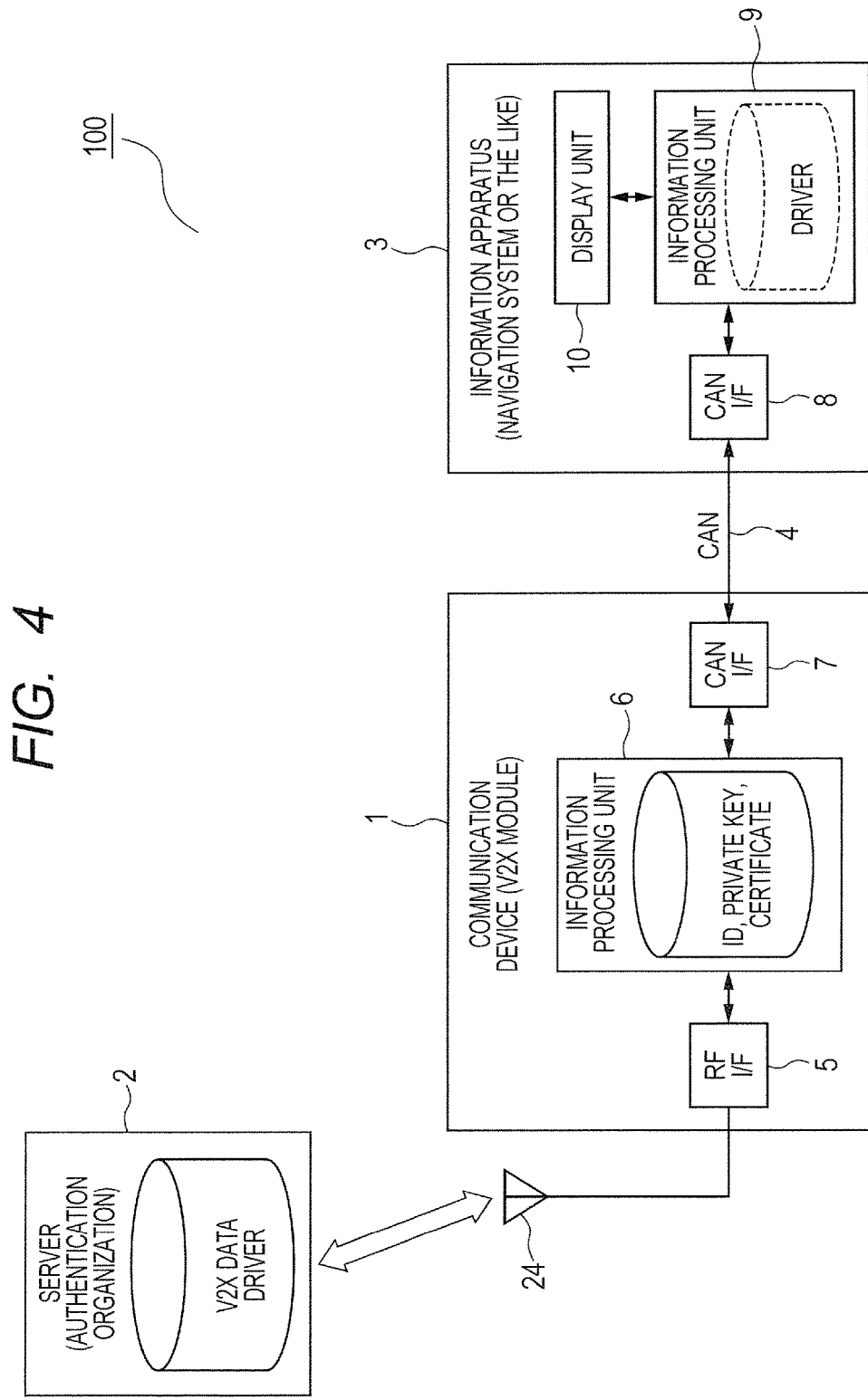
FIG. 4 is a block diagram for showing a configuration example of a communication system and a communication device according to the first embodiment, a second embodiment, and a third embodiment.

FIG. 4 is a block diagram for showing a configuration example of the communication system 100 and the communication device 1 according to the first embodiment. The server 2 is an authentication organization, and holds V2X data issued to the V2X module 1 and a driver that is installed in an information apparatus 3 such as a navigation system to be operated with the V2X module 1 in a coordinated manner. It is not necessary to use one physical server, but a server holding the V2X data may be different from one holding the driver. The V2X data is data that is mutually authenticated among all objects participating in the V2X communications such as between the automobiles, between the automobile and the roadside machine, and between the automobile and the pedestrian without using the server 2, and generally includes a certificate and confidential information to be mutually authenticated between the V2X modules. The V2X module as an example of the communication device 1 includes an RF interface (I/F) 5, a CAN interface (I/F) 7, and an information processing unit 6. An antenna 24 is coupled to the RF interface 5 to communicate with the server 2 and the other V2X modules. The CAN interface 7 communicates with the navigation system 3. The information processing unit 6 holds the ID (Identification) of the V2X module, a private key of a public key encryption system, and a certificate containing a corresponding public key. The navigation system 3 includes a CAN interface 8, an information processing unit 9, and a display unit 10. When the V2X module 1 is newly mounted, the V2X data containing the certificate necessary in the V2X communications is not installed in the V2X module 1, and further the driver is not installed in the navigation system. Therefore, if the V2X module 1 is coupled as it is, it does not function as a V2X module. In order to start the V2X communications, it is necessary to preliminarily install the V2X data in the V2X module 1_1. The V2X module 1 has the ID to certify itself, a certificate of the V2X module provider, and the related private key of the public key encryption system. Of the certificate and the private key, secrecy is required particularly for the private key, and thus the private key is desirably stored in a device having tamper resistance. Further, the public key corresponding to the private key held by the V2X module in the public key encryption system may be generated when the V2X module is set up. Accordingly, it is possible to reduce a risk that key information is leaked. It should be noted that the certificate in this case is different from the above-described one contained in the V2X data. The certificate contained in the V2X data is used by the V2X modules participating in the V2X communications to directly communicate with each other without using the server 2. On the other hand, the certificate in this case is used for a signature certifying itself when the V2X module 1 requests authentication to the server 2.

Further, the V2X module 1 itself is not provided with an interface such as a display device notifying a user of some information, and allows the information apparatus 3 to be coupled such as a navigation system to display or notify information to the user. The V2X module 1 is coupled to the navigation system 3 via the CAN 4, and has a basic communication driver (CAN driver) installed. However, it is necessary to install another driver to display or notify information from the V2X module 1 in the navigation system 3.

With reference to FIG. 1, a communication protocol performed by the communication system 100 and the V2X module 1 when the V2X module 1 according to the first embodiment is newly added will be described. The server 2 has a list in which the IDs of the V2X modules 1 are associated with the certificates, and preliminarily has the V2X data necessary in the V2X communications and the driver necessary for the navigation system 3. The server 2 may be configured using a plurality of servers.

The V2X module 1 executes secure boot when activating the system to verify the validity thereof. After the secure boot is completed, a signature is created using the confidential private key of the V2X module 1 in the public key encryption system, and is sent to the server 2 together with a result of the secure boot. It is necessary to describe the execution time of the secure boot in the result of the secure boot. Further, a time (time stamp) is contained in the signature. A time difference between the execution time of the secure boot and the time stamp of the signature is dependent on the performance of a device that performs a process. When the performance of a general V2X module is considered, it is conceivable that a time difference of 10 seconds or more is unnatural. Thus, when verifying the validity with the external server 2, it is desirable to verify by setting the time difference between two processes within about 10 seconds. Further, it is conceivable that about 10 seconds of the time difference between the time stamp of the signature and the execution time of the secure boot or the external server is appropriate in consideration of retransmission. However, when a replay attack is considered, 5 seconds or less is desirable. It should be noted that the signature verification itself can be realized by a general method. Specifically, the V2X module 1 creates as a signature, for example, the certificate containing the public key corresponding to the private key, the result of the secure boot, the time information (time stamp), and data obtained by encrypting a hash value calculated therefrom using the private key, and sends the signature to the external server 2. The external server 2 extracts the public key from the certificate contained in the received signature, and verifies the signature by comparing a hash value obtained by decrypting the encrypted data with a hash value obtained by using a hash function for plaintext contained in the certificate.

When the server 2 finishes the verification and confirms that the V2X module 1 is a correct device, the server 2 generates a session key. The session key is desirably a random number. The session key is encrypted using the public key contained in the received certificate, and is sent to the V2X module 1. Because the session key is encrypted using the public key of the V2X module 1, it is difficult to decrypt the same other than the V2X module 1. As candidates of encryption systems used in this case, there are RSA and ECC public key encryption systems. After the session key is safely sent, the server 2 encrypts the V2X data and the driver using the session key. In this case, a common key encryption system is used for high-speed data processing. If the processing time does not matter, the V2X data and the driver may be encrypted using the public key of the V2X module 1 before transmission without using the session key. Further, an arbitrary algorithm may be used for the common key encryption system. The V2X module 1 decrypts the received V2X data and driver using the corresponding key, and installs the V2X data therein. Accordingly, the V2X module 1 can be activated as a V2X module. The V2X data contains data that is high in secrecy and data that is not necessarily high in secrecy. However, it is necessary to carefully handle the data that is high in secrecy. The V2X module 1 sends and installs the decrypted driver to/in the navigation system 3. Accordingly, the navigation system 3 or the like can display or notify information from the V2X module 1 to the user.

The followings can be realized by establishing such a system: the integrity by the secure boot is verified; the validity (signature) is verified by a third party using the external server 2; communication routes are kept secret using an encryption system; and the V2X module 1 is coupled to the information apparatus 3 such as a navigation system or a display audio system only when the V2X module 1 coupled is a correct device.

A more detailed configuration example of the V2X module 1 will be described.

Figure 5:
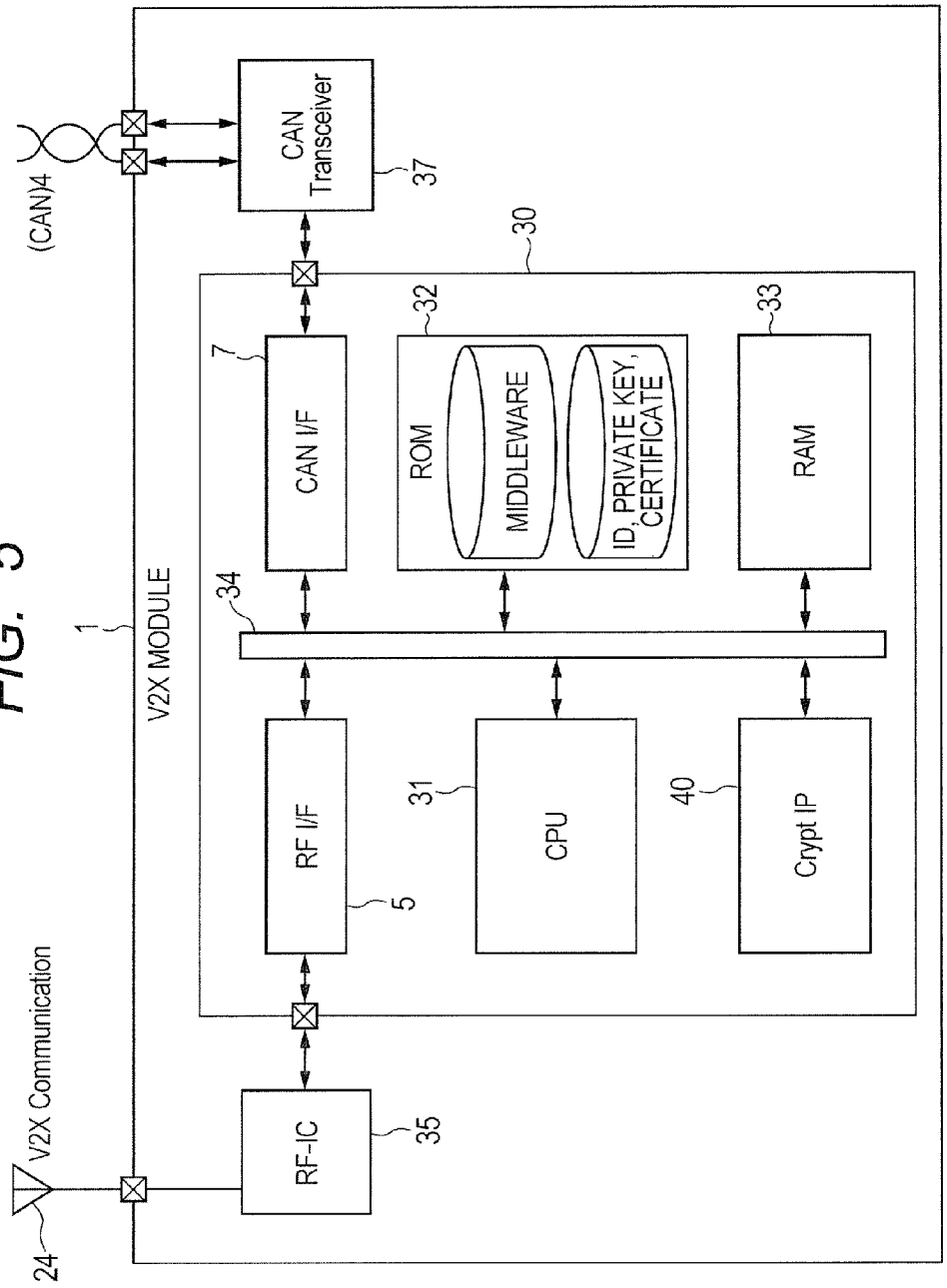
FIG. 5 is a block diagram for showing both of a more detailed configuration example of the communication device and a configuration example of an LSI mounted in the communication device.

FIG. 5 is a block diagram for showing both of a more detailed configuration example of the V2X module 1 that is an example of the communication device 1 and a configuration example of an LSI 30 mounted in the V2X module 1. The V2X module 1 includes an RF-IC 35 to which the antenna 24 is coupled, an LSI 30, and a CAN transceiver 37 coupled to the CAN. The RF-IC 35 is an integrated circuit that transmits and receives a high-frequency signal to perform the V2X communications, and may be mounted on the same chip as the LSI 30. The CAN transceiver 37 is a transceiver conforming to the communication protocol of the physical layer of the CAN, and may be mounted on the same chip as the LSI 30. The LSI 30 includes the RF interface 5 coupled to the RF-IC 35, the CAN interface 7 coupled to the CAN transceiver 37, a CPU 31, a ROM 32, a RAM 33, and a crypt IP 40, all of which are coupled to each other through a bus 34. The CPU 31 executes middleware supplied from the ROM 32 to control the protocol of the V2X communications and the protocol of the CAN. Then, the CPU 31 analyzes information obtained in the V2X communications to display information such as a warning on the information apparatus such as the navigation system 3 coupled via the CAN 4, or to notify a driver as a user using different means. The middleware is a program to execute the communication flow shown in FIG. 1. The ROM 32 is a non-volatile memory, and is preferably an electrically-rewritable memory. On the other hand, the middleware may be executed by being loaded to the RAM 33 when booting up using an external ROM. The RAM 33 is a volatile memory, and provides a work area when the CPU 31 executes a program. The crypt IP 40 is, for example, a circuit module that generates or decrypts a ciphertext, and monitors a current and power consumption. In addition, the crypt IP 40 has tamper resistance against an attack such as failure injection. The ID and the private key may be stored in the crypt IP 40 in consideration of the tamper resistance, or may be encrypted by the crypt IP 40 to be stored in the built-in ROM 32 or an external ROM. The LSI 30 is not particularly restricted, but is formed on a single semiconductor substrate such as silicon using, for example, a well-known manufacturing technique of a CMOS (Complementary Metal-Oxide-Semiconductor field effect transistor) semiconductor. The integration reduces the mounting area and the power consumption. In addition, the tamper resistance is improved.

The above description shows an example in which the V2X module 1 to perform the V2X communications is coupled to the navigation system 3 of an automobile, and cooperation such as a display or notification is performed.

However, the V2X module 1 may be coupled to not the navigation system 3 but another information apparatus such as a display audio system. Further, the communication network therebetween is not limited to the CAN 4 as described above. Further, the first embodiment shows an example in which when the server 2 authenticates the V2X module 1 that is an example of a communication device, the signature is authenticated in the public key encryption system. However, an arbitrary authentication method can be used.

Second Embodiment

Figure 6:
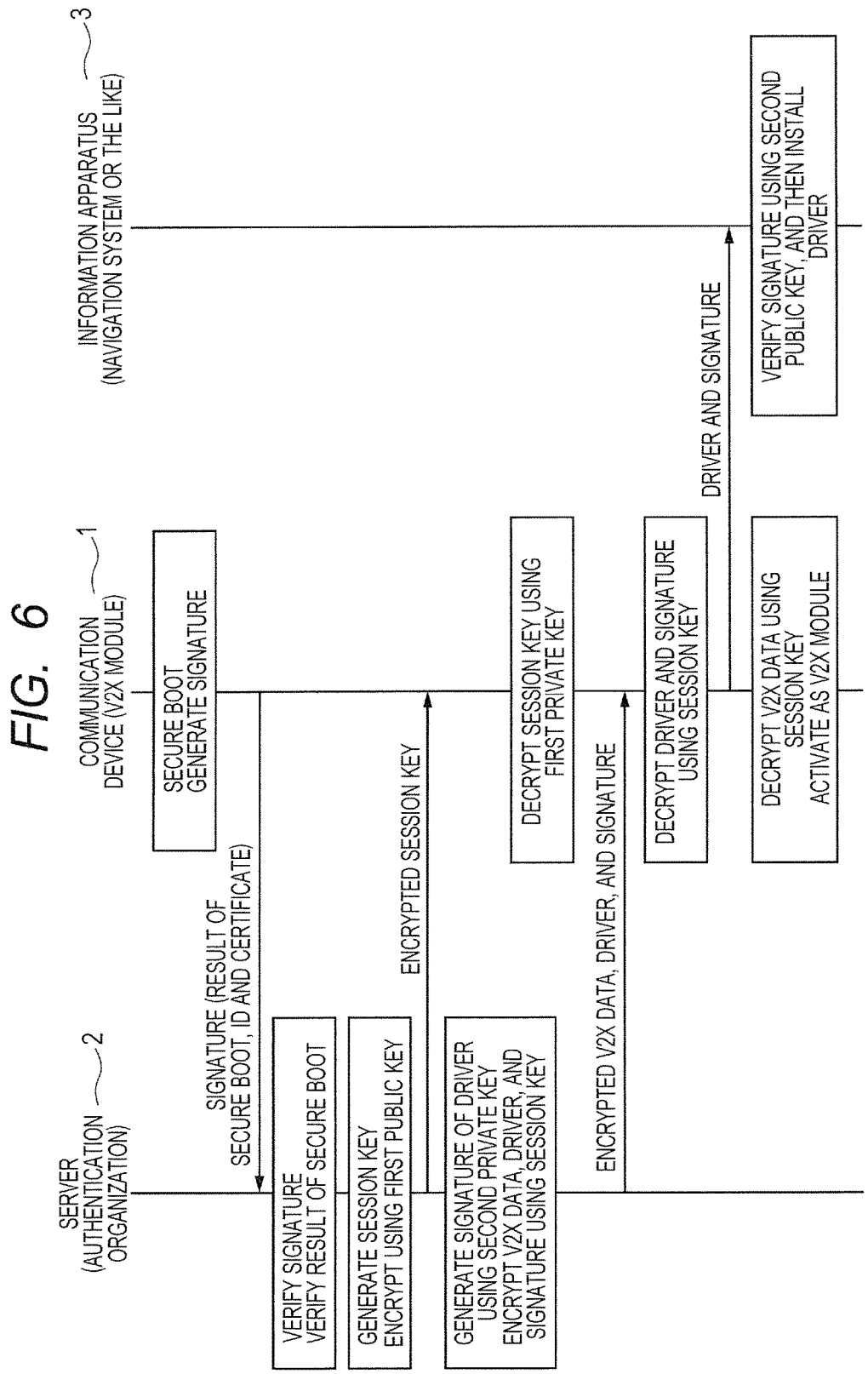
FIG. 6 is a flow diagram for showing a communication protocol performed by a communication system and a communication device according to the second embodiment.

FIG. 6 is a flow diagram for showing a communication protocol performed by a communication system 100 and a communication device 1 according to a second embodiment. The configurations of the communication system 100 and the communication device 1 according to the second embodiment are the same as those of the first embodiment described with reference to FIGS. 3, 4, and 5, and thus the explanation thereof will be omitted. In the method shown in the first embodiment, when the V2X module 1 having fake V2X data and driver prepared is coupled, the information apparatus 3 such as a navigation system or a display audio system has no means to confirm that the V2X module 1 is an unauthorized device. Therefore, it is desirable to mount a security function in the information apparatus 3 itself such as a navigation system or a display audio system. FIG. 6 shows a protocol in the case where a security function is mounted in the information apparatus 3 such as a navigation system or a display audio system. The V2X module 1 is an example of the communication device 1, and the navigation system 3 is an example of the information apparatus 3.

In order to establish the communications of the public key encryption system between the server 2 and the V2X module 1, the public key used for signature verification by the server 2 is referred to as a first public key. In association with this, the key held by the V2X module 1 is referred to as a first private key. The server 2 of the second embodiment has a second public key and a second private key different from those. After the secure boot, the V2X module 1 generates a signature containing the result of the secure boot, the ID and certificate of the V2X module 1, and the first public key using the first private key, and transmits the same to the server 2. The server 2 decrypts the received signature using the first public key to verify the signature, and further verifies the result of the secure boot of the 2X module 1. After all are confirmed, the session key is generated and encrypted using the first public key to be transmitted to the V2X module 1. The V2X module 1 decrypts the received session key using the first private key.

The server 2 sends the encrypted session key to the V2X module 1, and then generates the signature of the driver using the second private key. Further, the server 2 encrypts the V2X data, the driver, and the signature using the session key, and the sends the same to the V2X module 1. The V2X module 1 decrypts the received ciphertext using the already-received and decrypted session key to obtain the V2X data, the driver, and the signature. The V2X data is installed in the V2X module to be activated as an authorized V2X module, and the V2X communications can be performed. On the other hand, the driver and the signature are transmitted to the navigation system 3. In addition, the second public key is transmitted from the server 2 to the navigation system 3 via the V2X module 1. The navigation system 2 verifies the signature of the driver using the second public key. When it is determined that the signature of the driver is true, the driver is installed.

Accordingly, the information apparatus allows the server 2 to create the signature (second signature) of the driver using the second private key unique to the information apparatus, and verifies the same using the second public key associated with the second private key. Thus, after confirming that the received driver is true, the driver can be installed. Therefore, the security is more enhanced.

Third Embodiment

Figure 7:
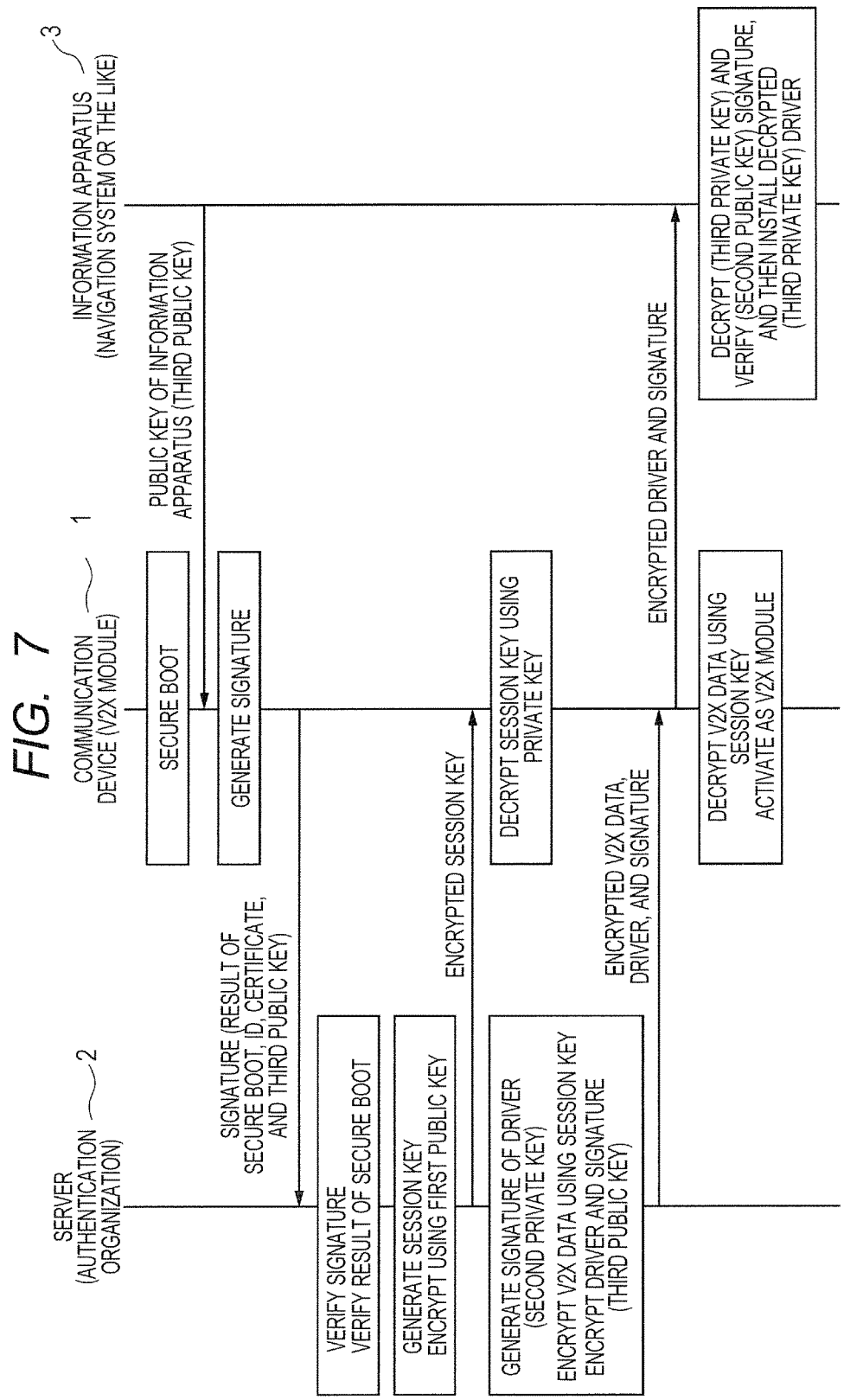
FIG. 7 is a flow diagram for showing a communication protocol performed by a communication system and a communication device according to the third embodiment.

FIG. 7 is a flow diagram for showing a communication protocol performed by a communication system 100 and a communication device 1 according to a third embodiment. The configurations of the communication system 100 and the communication device 1 according to the third embodiment are the same as those of the first embodiment described with reference to FIGS. 3, 4, and 5, and thus the explanation thereof will be omitted. FIG. 7 shows a protocol in the case where a security function is mounted in the information apparatus 3 such as a navigation system or a display audio system as similar to the second embodiment. The V2X module 1 is an example of the communication device 1, and the navigation system 3 is an example of the information apparatus 3.

The third embodiment is different from the second embodiment shown in FIG. 6 in that the driver and the signature are further encrypted using another encryption key to be transmitted. The third embodiment shows an example in which the navigation system 3 has a pair of third private and public keys different from the pairs of the first and second private and public keys.

After the secure boot, the V2X module 1 receives the third public key from the navigation system 3, and generates a signature containing the result of the secure boot, the ID and certificate of the V2X module 1, the first public key, and further the received third public key using the first private key to be transmitted to the server 2. The server 2 decrypts the received signature using the first public key to verify the signature, and further verifies the result of the secure boot of the V2X module 1. After all are confirmed, the session key is generated and encrypted using the first public key to be transmitted to the V2X module 1. The V2X module 1 decrypts the received session key using the first private key.

After the encrypted session key is transmitted, the server 2 generates the signature of the driver using the second private key as similar to the second embodiment, and encrypts the V2X data using the session key. However, unlike the second embodiment, the driver and the signature are encrypted using the third public key. The server 2 transmits the encrypted V2X data, driver and signature to the V2X module 1. The V2X module 1 decrypts the received V2X data using the session key, and installs the same. Thus, the V2X module 1 is activated as a V2X module. The V2X module 1 transmits the driver and the signature encrypted using the third public key to the navigation system 3 without decryption. The V2X module 1 cannot decrypt because there is no third private key associated with the third public key. The navigation system 3 decrypts the received ciphertext using the third private key, and verifies the signature of the server 2 using the second public key. Then, when it is determined that the signature is true, the driver decrypted using the third private key is installed.

Accordingly, the security is more enhanced. Because as similar to the case in which the session key is transmitted in the secure public key encryption system, the driver and the signature (second signature) can be also transmitted using the public key encryption system. In addition, as similar to the second embodiment, the information apparatus 3 verifies the signature (second signature) of the driver, and confirms that the received driver is true. Then, the driver can be installed. Thus, it becomes more difficult for an attacker to falsify data sent from the server 2. Further, the driver is encrypted using the third public key, and thus cannot be decrypted by the V2X module 1. Accordingly, it becomes difficult to launch an attack such as reading or falsifying the driver by fraudulently operating the V2X module 1 when passing through the V2X module 1.

Fourth Embodiment

Figure 8:
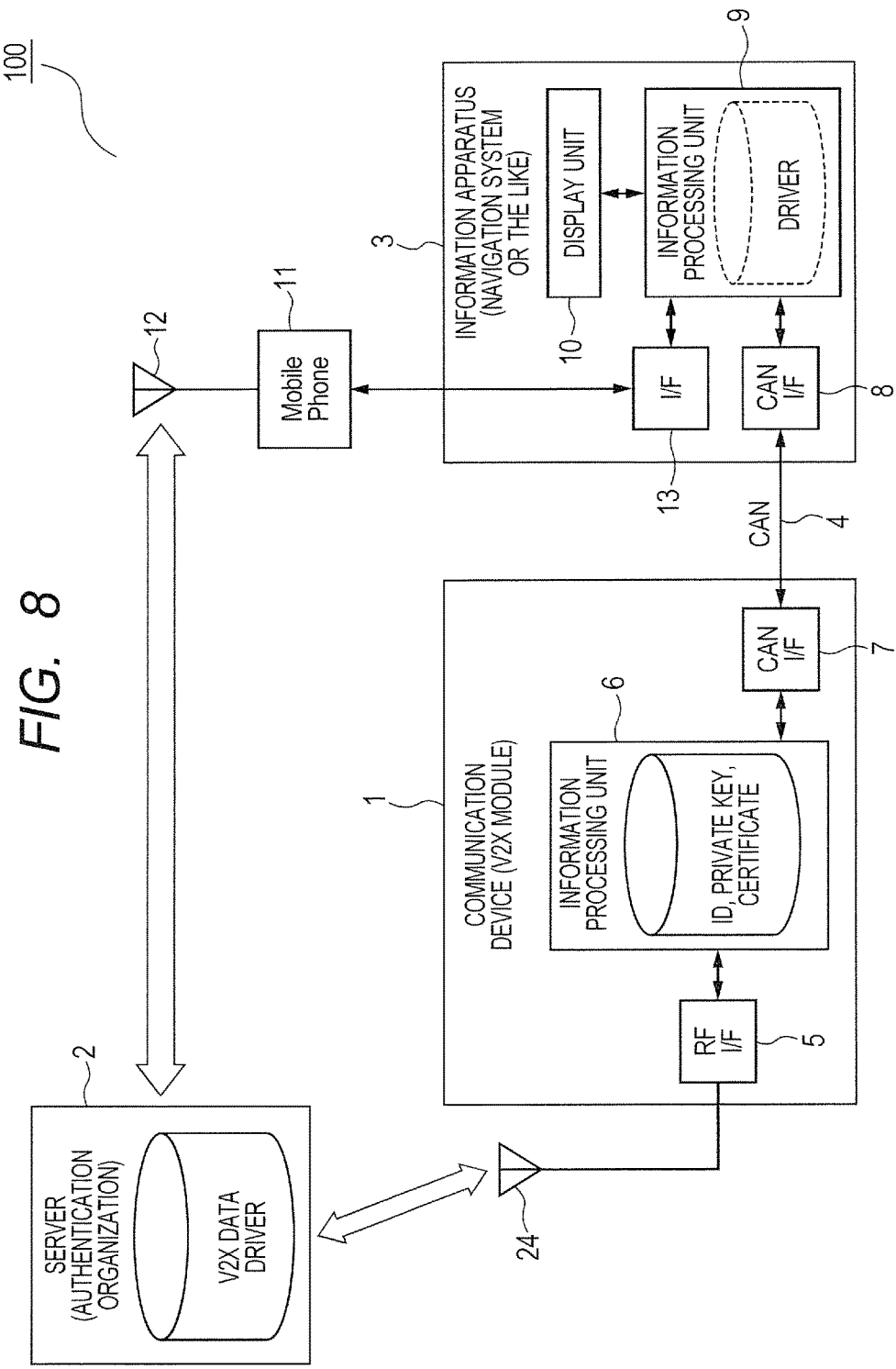
FIG. 8 is a block diagram for showing a configuration example of a communication system and a communication device according to a fourth embodiment and a fifth embodiment.

In the case where the information apparatus 3 such as a navigation system or a display audio system has an external communication function other than the V2X module 1, use of the communications is effective. FIG. 8 is a block diagram for showing a configuration example of a communication system 100 and a communication device 1 according to a fourth embodiment. The communication system 100 shown in FIG. 8 is different from that shown in FIG. 4 in that a mobile communication terminal (mobile phone) 11 such as a smartphone is coupled to the information apparatus 3 such as a navigation system, and communications can be performed with the server 2 using another communication channel (in this case, a wireless phone as an example). The navigation system 3 includes an interface (I/F) 13 to connect the mobile communication terminal 11, an antenna 12 is coupled to the mobile communication terminal 11 coupled via the interface 13, and communications can be performed with the server 2 through data communications on a wireless phone line. The other configurations are the same as those of FIG. 4, and thus the explanation thereof will be omitted. Communication means other than the wireless phone, for example, a public wireless LAN may be used. The fourth embodiment will be described on the assumption that the V2X module 1 is an example of the communication device 1 and the navigation system 3 is an example of the information apparatus 3. As shown in FIG. 3, the mobile communication terminal (mobile phone) 11 is coupled to the navigation system 3 mounted in the vehicle 20_1, and a data communication line is established between the authentication server 2 and the carrier base station 14. A communication line different from the V2X communications is provided between the navigation system 3 and the authentication server 2 through wireless data communications via antennas 12_1 and 12_2. In each of the communication lines between the navigation system 3 and the mobile communication terminal 11, between the mobile communication terminal 11 and the carrier base station 14, and between the carrier base station 14 and the authentication server 2, the security is secured by an arbitrary method.

FIG. 9 is a flow diagram for showing a communication protocol performed by the communication system 100 and the communication device 1 according to the fourth embodiment. The V2X module 1 executes the secure boot when the system is activated, and verifies the validity of the V2X module 1 as similar to the first embodiment. After the secure boot is completed, a signature is created using the confidential private key held by the V2X module 1. In the first embodiment, the V2X module 1 transmits the created signature to the server 2 via the V2X communication lines. In the fourth embodiment, however, the V2X module 1 transmits the created signature to not the server 2 but the navigation system 3, and transmits the created signature to the server 2 via the mobile communication terminal 11. The server 2 verifies the signature and the result of the secure boot of the V2X module 1. When it is determined that the V2X module 1 is a true V2X module, the session key is generated and encrypted using the public key. The encrypted session key is transmitted to the V2X module 1 via the V2X communications, and the V2X module 1 having received the encrypted session key decrypts the same using the private key. The server 2 further encrypts the V2X data and the driver using the session key, and transmits the encrypted V2X data and driver to the V2X module. The V2X module 1 having received the encrypted V2X data and driver decrypts the same using the session key, and installs the V2X data therein to be activated as a V2X module. Then, the driver is transmitted to the navigation system 3 to be installed.

Accordingly, it is possible to prevent an attack from the vehicle information communications via the communication device 1, or an attack from the communication device 1 itself on the on-vehicle network 4 to which the information apparatus 3 is coupled.

Fifth Embodiment

FIG. 10 is a flow diagram for showing a communication protocol performed by a communication system 100 and a communication device 1 according to a fifth embodiment. As similar to the second and third embodiments, FIG. 10 shows a protocol in the case where a security function is mounted in the information apparatus 3 such as a navigation system or a display audio system. The V2X module 1 is an example of the communication device 1, and the navigation system 3 is an example of the information apparatus 3. Further, for the communications of the public key encryption system between the server 2 and the V2X module 1, the public key used by the server 2 for signature verification is referred to as a first public key, and the key held by the V2X module 1 is referred to as a first private key. For authentication between the server 2 and the navigation system 3, the private key used by the server 2 to generate the signature is referred to as a second private key. In association with this, the public key used by the navigation system 3 for signature verification is referred to as a second public key.

The fifth embodiment is different from the fourth embodiment shown in FIG. 9 in that the navigation system 3 generates a pair of third private and public keys different from the pairs of the first and second private and public keys. The keys are not necessarily generated by the navigation system 3. Those generated outside may be installed. However, the keys generated inside are higher in the security level. The V2X module 1 generates a signature based on the result of the secure boot, the ID, and the certificate containing the first public key using the first private key, and transmits the same to the navigation system 3. The navigation system 3 adds the third public key to the received signature to be transmitted to the server 2 through communications via the mobile communication terminal 11. The server 2 verifies the received signature of the V2X module 1 and the result of the secure boot. When it is determined that the V2X module 1 is a correct device, the session key is generated and encrypted using the first public key. The encrypted session key is transmitted to the V2X module 1 via the V2X communications, and the V2X module having received the encrypted session key decrypts the same using the first private key. The server 2 further encrypts the V2X data using the session key, and transmits the encrypted V2X data to the V2X module 1. The V2X module 1 having received the encrypted V2X data decrypts the V2X data using the session key, and installs the V2X data therein to be activated as a V2X module. Further, the server 2 generates the signature of the driver using the second private key, and encrypts the driver and the signature using the third public key to be transmitted to the navigation system 3 via the mobile communication terminal 11. The navigation system 3 decrypts the received ciphertext using the third private key, and verifies the signature using the second public key. Then, the driver decrypted using the third private key is installed.

Accordingly, the security is more enhanced. Because as similar to the case in which the session key is transmitted in the secure public key encryption system, the driver and the signature (second signature) can be also transmitted using the public key encryption system. In addition, as similar to the second embodiment, the information apparatus 3 verifies the signature (second signature) of the driver, and confirms that the received driver is true. Then, the driver can be installed. Thus, it becomes more difficult for an attacker to falsify data sent from the server 2.

Further, while combining the fifth embodiment with the third embodiment, means to compare and verify the both data of the driver and the signature sent via the mobile communication terminal and the V2X module is also effective. Accordingly, the security is more enhanced. Further, the driver is encrypted using the second public key, and thus cannot be decrypted by the V2X module 1. Accordingly, it becomes difficult to launch an attack such as reading or falsifying the driver by fraudulently operating the V2X module 1 when passing through the V2X module 1. Sixth Embodiment (general communication system and communication device used therefor)

In the above-described embodiments, a case in which the entire communication system is adapted to the V2X communications has been exemplified. However, the present invention can be applied to the other communication systems. Specifically, a communication system according to a representative embodiment is a communication system 100 having an information apparatus 3, a communication device 1 coupled to the information apparatus 3, a server 2, and communication means between the communication device 1 and the server 2, and is configured as follows. The server 2 holds a driver that is installed in the information apparatus 3 to allow the information apparatus 3 to cooperate with the communication device 1. The communication device 1 transmits the signature of the communication device 1 to the server 2 when being coupled to the information apparatus 3. When it is determined that the communication device 1 is an authorized communication device as a result of verification of the signature, the server 2 transmits the driver to the information apparatus 3, and the information apparatus 3 installs the received driver.

The term "to cooperate" in this case means to operate in a coordinated manner. According to each embodiment of the application, an example in which the information apparatus notifies the user through some display or alarm sound by means of an instruction and control from the communication device 1 is exemplified. However, the present invention is not limited to this, but includes various types of cooperation.

Accordingly, it is possible to prevent an attack from or via the communication device 1 on the information apparatus 3. Only when the authentication requested by the communication device 1 using the signature of the communication device 1 is confirmed by the external authentication server 2, the driver installed in the information apparatus 3 to be coupled is distributed from the server 2. Thus, it is possible to prevent fraudulent intrusion to the information apparatus 3 via the communication device 1, or an attack on the information apparatus 3 using malware originally embedded in the communication device 1.

In this case, data corresponding to the V2X data shown in FIG. 1 is not necessarily installed in the communication device 1. However, in the case of communications without using the server 2 such as V2X communications and vehicle-to-vehicle communications after being authenticated once by the server, data corresponding to the V2X data is preferably installed in the communication device 1 to be used for the communications in order to facilitate mutual authentication. In FIG. 1, the communication device 1 holds the unique private key, and communications can be performed in the public key encryption system. FIG. 1 discloses an example in which the server 2 confirms the validity of the communication device 1, and then encrypts the driver using the preliminarily-generated session key before transmission. In this case, the session key is preferably a common key in the common key encryption system. The transmission of the session key itself is protected in the public key encryption system. In the public key encryption system, the key can be easily shared and managed. However, an operation load for decryption is heavy. On the other hand, the common key encryption system has a problem in sharing of the key. However, an operation load for decryption is light. Therefore, while the session key is preferable in transmission of relatively large data such as the driver, the session key is discarded after being used only in one session. If there is a margin for the operation capacity of the communication device 1, the driver may be transmitted by not the common key encryption system using the session key but the public key encryption system. When the communication device 1 is coupled to the information apparatus 3 to transmit the signature of the communication device 1 to the server 2, it is preferable to encrypt in the public key encryption system as exemplified in FIG. 1. In the case where the driver is transmitted by not the common key encryption system using the session key but the public key encryption system, it is not necessary to generate and encrypt the session key with the server 2, to transmit to the communication device 1, and to decrypt the session key in the communication device 1.

When focusing on the communication device 1 in this case, the communication device 1 according to a representative embodiment includes a first interface 5 that performs first communications with the server 2, a second interface 7 that performs second communications with the information apparatus 3, and the information processing unit 6 that performs an information process including a communication protocol process accompanied by the first and second communications, and is configured as follows. The information processing unit 6 transmits the signature of the communication device 1 from the first interface 5 to the server 2, receives via the first interface 5 the driver transmitted after the server 2 authenticates the communication device 1 on the basis of the signature, and transmits the received driver from the second interface 7 to the information apparatus 3.

Accordingly, it is possible to prevent an attack from or via the communication device 1 on the information apparatus 3. Only when the authentication requested by the communication device 1 using the signature of the communication device 1 is confirmed by the external authentication server 2, the driver installed in the information apparatus 3 to be coupled is distributed from the server 2. Thus, it is possible to prevent fraudulent intrusion to the information apparatus 3 via the communication device 1, or an attack on the information apparatus 3 using malware originally embedded in the communication device 1.

It is preferable that the communication device 1 performs the secure boot when being activated, and generates the signature containing the result of the secure boot using the private key to be transmitted to the server 2. The secure boot is not necessarily essential. However, the result of the secure boot is transmitted to the server, and then the server 2 can advance to the following processes after verifying the result of the secure boot of the communication device 1. Thus, it is possible to detect the falsification to the communication device 1, and the security is enhanced.

In the case where a security function is mounted in the information apparatus 3, as exemplified in the second, third, and fifth embodiments, the public key encryption system using the second public key and the second private key that are different from the first public key and the first private key used in the signature authentication of the public key encryption system between the communication device 1 and the server 2 may be adopted. For example, the second public key and the second private key can be generated by the information apparatus 3 using the security function of the information apparatus 3.

As exemplified in the second embodiment, the communication device 1 receives via the first interface 5 the second signature generated using the second private key by the server 2 and the driver encrypted using the session key together with the second signature, decrypts the received and encrypted second signature using the session key, and transmits the decrypted second signature from the second interface 7 to the information apparatus 3.

Accordingly, the information apparatus 3 allows the server 2 to create the signature (second signature) of the driver using the second private key unique to the information apparatus 3, and the signature is verified using the second public key associated with the second private key. Then, after it is confirmed that the received driver is true, the driver can be installed. Accordingly, the security is more enhanced. Further, the driver is encrypted using the second public key, and thus cannot be decrypted by the communication device 1. Accordingly, it becomes difficult to launch an attack such as reading or falsifying the driver by fraudulently operating the communication device 1 when passing through the communication device 1.

Further, as exemplified in the third embodiment, the information apparatus 3 has the pair of third private and public keys different from the pairs of first and second private and public keys. The communication device 1 generates using the first private key the signature further containing the third public key received from the information apparatus 3 via the second interface 7, and transmits the same to the server 2. The server 2 decrypts the received signature using the first public key to verify the signature. After it is confirmed that the signature is true, the session key is generated and encrypted using the first public key. Then, the encrypted session key is transmitted to the communication device 1. The communication device 1 decrypts the received session key using the first private key. The communication device 1 receives via the first interface 5 the session key encrypted by the server 2 using the first public key, and decrypts the received and encrypted session key using the first private key. The communication device 1 receives via the first interface 5 the driver and the second signature encrypted by the server 2 using the third public key, and transmits the received and encrypted driver and second signature from the second interface 7 to the information apparatus 3. The information apparatus 3 decrypts the same using the third private key to obtain the driver and the second signature. After the validity of the second signature is verified using the second public key, the driver decrypted using the third private key is installed. Accordingly, it is possible to allow the information apparatus 3 to cooperate with the communication device 1 under the safe environment.

Accordingly, as similar to the case in which the session key is transmitted in the secure public key encryption system, the driver and the signature (second signature) can be also transmitted using the public key encryption system. In addition, as similar to the second embodiment, the information apparatus 3 verifies the signature (second signature) of the driver, and confirms that the received driver is true. Then, the driver can be installed. Thus, the security is more enhanced.

As exemplified in the fourth and fifth embodiments, another communication channel (third communications) may be provided between the information apparatus 3 and the server 2. Accordingly, the driver can be directly transmitted to the information apparatus 3 without being relayed by the communication device 1.

Accordingly, as similar to the case in which the session key is transmitted in the secure public key encryption system as in the above-described example, the driver and the signature (second signature) can be also transmitted using the public key encryption system. In this case, unlike the above-described example, the driver and the signature are transmitted through the third communications between the server and the information apparatus 3 without passing through the communication device 1. Although the communication route differs, as similar to the above-described example, the information apparatus 3 verifies the signature (second signature) of the driver, and confirms that the received driver is true. Then, the driver can be installed. Thus, the security is more enhanced.

The invention made by the inventors has been concretely described above on the basis of the embodiments. However, it is obvious that the present invention is not limited to the embodiments, but may be variously changed without departing from the scope of the present invention.

What is claimed is:
1. A communication device comprising:
    a first interface that performs first communications with a server,
    a second interface that performs second communications with an information apparatus, and
    an information processing unit that performs an information process including a communication protocol process accompanied by the first and second communications,
    wherein a first driver for transmitting data is installed in the information apparatus to communicate with the communication device,
    wherein the communication device performs secure boot,
    wherein the communication device sends a signature of the communication device and a result of the secure boot from the first interface to the server, and receives via the first interface a second driver sent from the server after the server authenticates that the communication device is a secure device on the basis of the signature and the result of the secure boot, the second driver being different from the first driver,
    wherein the communication device sends the received second driver as data from the second interface to the information apparatus via the first driver, wherein the second driver is software that is installed in the information apparatus to allow the information apparatus to cooperate with the communication device, wherein the communication device sends control, commands, or instruction to the information apparatus via the second driver, and wherein the information apparatus is operated on the basis of the control, commands, or instructions from the communication device.

2. The communication device according to claim 1, wherein the authentication is performed by a public key encryption system, wherein the information processing unit holds a private key that is associated with a public key used for the authentication by the server and is unique to the communication device, wherein the communication device performs secure boot before generating the signature, and wherein the information processing unit generates the signature using the private key.

3. The communication device according to claim 2, wherein the information processing unit receives via the first interface a session key encrypted by the server using the public key, and decrypts the received and encrypted session key using the private key, wherein the information processing unit receives via the first interface a driver encrypted by the server using the session key, and decrypts the received and encrypted driver using the session key, and wherein the session key is a common key conforming to a common key encryption system.

4. The communication device according to claim 3, wherein the signature of the communication device is used as a first signature, a signature of the driver is used as a second signature, the public key is used as a first public key, the private key is used as a first private key, a private key that is held by the server and is unique to the information apparatus is used as a second private key, and a public key associated with the second private key is used as a second public key, and wherein the information processing unit receives via the first interface the second signature generated by the server using the second private key and the driver encrypted using the session key together with the second signature, decrypts the received and encrypted second signature using the session key, and sends the decrypted second signature from the second interface to the information apparatus.

5. The communication device according to claim 3, wherein the signature of the communication device is used as a first signature, a signature of the driver is used as a second signature, the public key is used as a first public key, the private key is used as a first private key, a private key that is held by the server and is unique to the information apparatus is used as a second private key, a public key associated with the second private key is used as a second public key, a private key that is unique to the information apparatus and is different from the first and second private keys is used as a third private key, and a public key associated with the third private key is used as a third public key, wherein the information processing unit generates the signature further containing the third public key received from the information apparatus via the second interface, wherein the information processing unit receives via the first interface the session key encrypted by the server using the first public key, and decrypts the received and encrypted session key using the first private key, wherein the information processing unit receives via the first interface the driver encrypted by the server using the third public key and the second signature that is generated by the server using the second private key and is encrypted using the third public key, and sends the received and encrypted driver and second signature from the second interface to the information apparatus, and wherein the session key is a common key conforming to a common key encryption system.

6. The communication device according to claim 4, wherein the communication device is mounted in a vehicle, wherein the first communications are vehicle information communications performed between the vehicle and another device, wherein the second communications are communications via an on-vehicle network in the vehicle, wherein the information processing unit receives via the first interface authentication data encrypted by the server using the session key, wherein the information processing unit decrypts the received and encrypted authentication data using the session key, wherein the information processing unit activates the communication device as a true communication terminal in the vehicle information communications on the basis of the decrypted authentication data, and wherein the information processing unit generates information to be notified on the basis of the vehicle information communications, sends the information to the information apparatus via the second interface, and allows the information apparatus to execute notification corresponding to the information to be notified using the driver.

7. The communication device according to claim 1, wherein the information processing unit and the first and second interfaces are formed on a single semiconductor substrate.

8. The semiconductor device according to claim 7, wherein the information processing unit includes a processor, a program executed by the processor, and a non-volatile memory holding the first private key.

9. A program that is executed by the processor according to claim 8 to allow the information processing unit to perform the information process including a communication protocol process accompanied by the first and second communications, wherein the information processing unit sends the signature of the communication device from the first interface to the server, receives via the first interface the driver sent after the server authenticates the communication device on the basis of the signature, and sends the received driver from the second interface to the information apparatus.

10. A communication device comprising:

a first interface that performs first communications with a server, a second interface that performs second communications with an information apparatus, and an information processing unit that performs an information process including a communication protocol process accompanied by the first and second communications, wherein a first driver for transmitting data is installed in the information apparatus to communicate with the communication device, wherein the communication device performs secure boot, wherein the communication device sends a signature of the communication device and a result of the secure boot from the second interface to the information apparatus, and sends the signature and a result of the secure boot from the information apparatus to the server through third communications between the information apparatus and the server, wherein a second driver, as data sent from the server after the server authenticates that the communication device is a secure device on the basis of the signature and the result of the secure boot, is sent to the information apparatus through the first communication and the second communications via the first driver, or the third communications, the second driver being different from the first driver, wherein the second driver is software that is installed in the information apparatus to allow the information apparatus to cooperate with the communication device, wherein the communication device sends control, commands, or instruction to the information apparatus via the second driver, and wherein the information apparatus is operated on the basis of the control, commands, or instructions from the communication device.

11. The communication device according to claim 10, wherein the authentication is performed by a public key encryption system, wherein the information processing unit holds a private key that is associated with a public key used for the authentication by the server and is unique to the communication device, wherein the communication device performs secure boot before generating the signature, and wherein the information processing unit generates the signature using the private key.

12. The communication device according to claim 11, wherein the information processing unit receives via the first interface a session key encrypted by the server using the public key, and decrypts the received and encrypted session key using the private key, wherein the information processing unit receives via the first interface a driver encrypted by the server using the session key, and decrypts the received and encrypted driver using the session key, and wherein the session key is a common key conforming to a common key encryption system.

13. The communication device according to claim 11, wherein the information processing unit receives via the first interface a session key encrypted by the server using the public key, and decrypts the received and encrypted session key using the private key, and wherein the information processing unit receives via the first interface a driver sent after the server authenticates the communication device on the basis of the signature, and sends the received driver from the second interface to the information apparatus.

14. The communication device according to claim 12, wherein the communication device is mounted in a vehicle, wherein the first communications are vehicle information communications performed between the vehicle and another device, wherein the second communications are communications via an on-vehicle network in the vehicle, wherein the third communications are data communications using a wireless phone line, wherein the information processing unit receives via the first interface authentication data encrypted by the server using the session key, wherein the information processing unit decrypts the received and encrypted authentication data using the session key, wherein the information processing unit activates the communication device as a true communication terminal in the vehicle information communications on the basis of the decrypted authentication data, and wherein the information processing unit generates information to be notified on the basis of the vehicle information communications, sends the information to the information apparatus via the second interface, and allows the information apparatus to execute notification corresponding to the information to be notified using the driver.

15. The communication device according to claim 10, wherein the information processing unit and the first and second interfaces are formed on a single semiconductor substrate.

16. The semiconductor device according to claim 15, wherein the information processing unit includes a processor, a program executed by the processor, and a non-volatile memory holding the first private key.

17. A program that is executed by the processor according to claim 16 to allow the information processing unit to perform the information process including a communication protocol process accompanied by the first and second communications, wherein the information processing unit sends the signature of the communication device from the second interface to the information apparatus, and sends the signature from the information apparatus to the server through third communications different from the first communications between the information apparatus and the server.

18. A communication system comprising:

an information apparatus, a communication device coupled to the information apparatus, a server, and a communication unit between the communication device and the server, wherein a first driver for transmitting data is installed in the information apparatus to communicate with the communication device, wherein the communication device performs secure boot, wherein the server holds a second driver that is installed in the information apparatus to allow the information apparatus to cooperate with the communication device, the second driver being different from the first driver, wherein the communication device transmits a signature of the communication device and a result of the secure boot to the server when being coupled to the information apparatus, wherein when it is determined that the communication device is an authorized communication device as a result of verification of the signature and the result of the secure boot, the server transmits the second driver to the information apparatus, and the information apparatus installs the received second driver, wherein the communication device sends control, commands, or instruction to the information apparatus via the second driver, and wherein the information apparatus is operated on the basis of control, commands, or instructions from the communication device.

19. The communication system according to claim 18, wherein the server further holds authentication data that is installed in the communication device to activate the communication device as a true communication device adapted to the communication unit, and wherein when it is determined that the communication device is an authorized communication device as a result of verification of the signature, the server transmits the authentication data to the communication device, and the communication device installs the received authentication data.

20. The communication system according to claim 19, wherein the communication device and the information apparatus are mounted in a vehicle, and the communication unit is vehicle information communications between the vehicle and another device.

\* \* \* \* \*